United States Patent [19]
Barabash

[11] Patent Number: 5,286,036
[45] Date of Patent: Feb. 15, 1994

[54] METHOD OF PLAYING ELECTRONIC GAME, AND ELECTRONIC GAME

[75] Inventor: Michael Barabash, Brooklyn, N.Y.

[73] Assignee: Abrasion Engineering Company Limited, Channel Islands

[21] Appl. No.: 941,940

[22] Filed: Sep. 8, 1992

[51] Int. Cl.⁵ .......................... A63F 9/18; G09B 7/04
[52] U.S. Cl. ..................................... 273/429; 434/332
[58] Field of Search ............... 273/429, 430, 431, 432, 273/433, 434, 435, 436; 434/332

[56] References Cited
U.S. PATENT DOCUMENTS 5,035,625 7/1991 Munson et al. ................... 434/332

Primary Examiner—William H. Grieb

[57] ABSTRACT

When an entertaining electronic game is played, it is interrupted by an educational game, and can be resumed only after a problem of the educational game is solved by a player. Otherwise, it is interrupted again by the educational game, until the problem is solved.

8 Claims, 1 Drawing Sheet

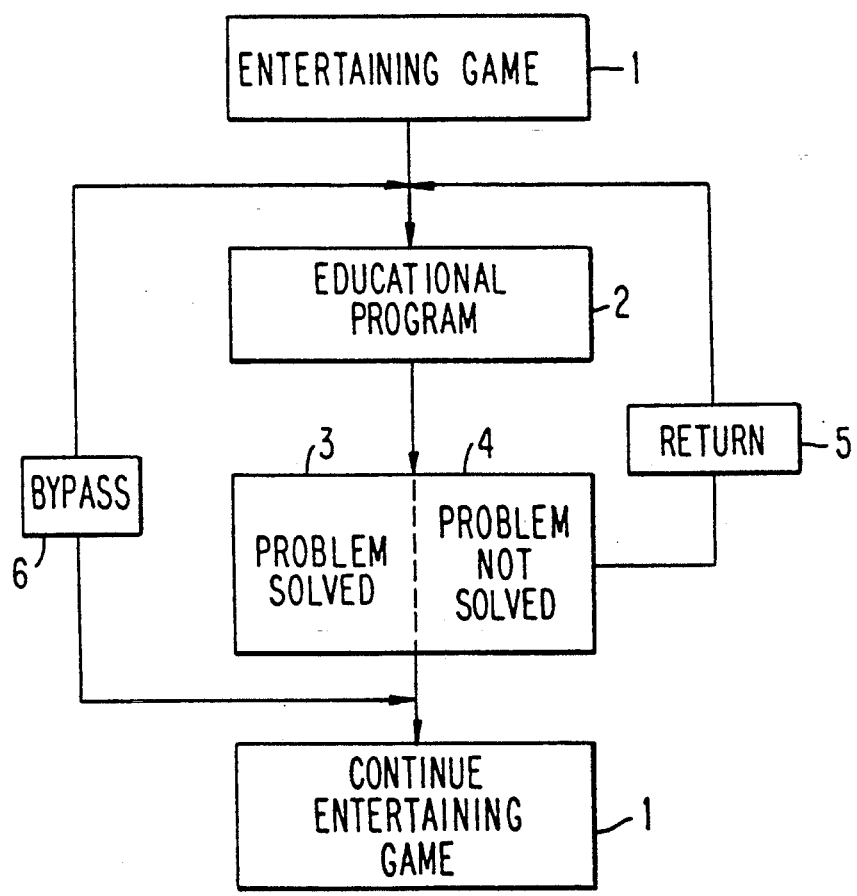

METHOD OF PLAYING ELECTRONIC GAME, AND ELECTRONIC GAME

BACKGROUND OF THE INVENTION

The present invention relates to a method of playing electronic game, and also to a new electronic game.

Electronic games are widely known and played by children and adults. The majority of the electronic games are generally entertaining games. Children play such games for hours, frequently to certain frustration of their parents. There are of course some education games; however, as expected, children are not willing to play them for a long time since as a rule they are nor sufficiently entertaining.

SUMMARY OF THE INVENTION

Accordingly, it is an object of the present invention to provide an electronic game which avoids the disadvantages of the prior art.

In keeping with these objects and with others which will become apparent hereinafter, one feature of the present invention resides, briefly stated, in a method of playing electronic game, in accordance with which a part of an electronic game which has entertaining nature is played, then the game with entertaining nature is automatically interrupted, then an educational game is introduced with a problem to be solved by a player, and then the entertaining game is resumed only if the problem of the educational game is solved by the player.

Another object of the present invention is an electronic game which has an entertaining program and an educational program, formed so that after a portion of the entertaining program an educational program with a problem to be solved is introduced, and the entertaining program is resumed only when the problem of the educational program is solved by a player.

When the electronic game is designed and played in accordance with the present invention, a child who plays an entertaining electronic game must at the same time be involved and solve the problems of educational nature; otherwise he or she will be unable to continue playing the entertaining game. This contributes to the child's education during playing, in natural and unintrusive manner.

The novel features of the present invention are set forth in particular in the appended claims. The invention itself, however, both as to its construction and method of operation, will be best understood from the following description of preferred embodiments, which is accompanied by the following drawings.

BRIEF DESCRIPTION OF THE DRAWINGS

The single FIGURE of the drawings is a view which schematically shows a mode of playing an electronic game in accordance with the present invention.

DESCRIPTION OF PREFERRED EMBODIMENTS

In accordance with a present invention a child starts playing any electronic game in his computer, designed and programmed for such a game 1. The game has a distinct entertaining nature of any type. In the computer there are also programmed some educational programs, for example mathematics, science, phonetics, reading, or other programs 2.

The game as a whole is programmed so that after a certain part of the entertaining game or a certain time of playing the same, the entertaining game is interrupted and the playing is switched to an educational program. A child must solve a problem posed in the educational program. For example, if during solving the problem he obtains a score of more than 80%, the game is then again switched to the entertaining program (see 3) and the child continues to play entertaining game, with which he started. If however the child obtains a score of less than 80%, then the educational program is repeated again until he or she solves the problem (see 4,5).

In accordance with another feature of the present invention, the results of the child's performance during the problem solving in the educational program are memorized and can be printed out, so that parents can monitor the child's performance and progress. This is also important for the child to see the record of his improvement in solving of problems in the respective educational subjects.

The educational programs can be not only composed of video images, but also accompanied by sounds. There can be many educational programs which can be alternatingly introduced into the same entertaining electronic game. Moreover, there can be a password which is known only to parents, so that the parents can turn off the educational program if desired (see 6).

Hereinbelow some examples of the inventive game and method of playing an electronic game are presented.

EXAMPLE I

A child turns on a game "Prince" in which a prince is travelling so as to find himself a princess. The game is of a purely entertaining nature and has four levels. When the first level is over, an educational program is automatically turned on. In particular on the screen of the game a problem $3\sqrt{123}$ appears. If the child solves the problem and draws on the screen a correct answer, he or she is transferred to a second level of the main game and continues to play at the second level. If however the child gives a wrong answer, the educational program with the same problem is repeated again, until the child solves the problem.

EXAMPLE 2

A child turns on a game "Goose" in which a goose must be caught by a player. Every 10 minutes the game is automatically stopped and the Pythagorean theorem appears on the screen in part, for example, only a triangle is shown. The child must write on the screen the exact wording of the theorem. If he or she writes it correctly, the entertaining game continues again. If not, the theorem appears on the screen again.

The above described invention is not limited to the details shown since various modifications and structural changes are possible without departing in any way from the spirit of the present invention.

What is desired to be protected by Letters Patent is set forth in particular in the appended claims.

I claim:

1. A method of playing an electronic game, comprising the steps of first playing an entertaining game in accordance with an entertaining game program;

then after a predetermined time automatically interrupting by a main program of the game the entertaining game by an educational game operated by an educational game program and having a problem to be solved; and resuming by a main program of the game playing the entertaining game only after the problem of the educational game is solved by a player.

2. A method as defined in claim 1 and further comprising the step of automatically starting again the educational game if the problem of the educational game is not solved by a player.

3. A method as defined in claim 1, wherein said interrupting includes interrupting of the entertaining game after a certain time of playing of the entertaining game.

4. A method as defined in claim 1, wherein said interrupting includes interrupting of the entertaining game after ending a certain level of the entertaining game.

5. A method as defined in claim 1 and further comprising the step of bypassing the interrupting and going straight to the continuing playing the entertaining game without solving the problem of the entertaining game.

6. A method as defined in claim 1 and further comprising the step of removing the educational game and introducing another educating game into the same entertaining game.

7. A method as defined in claim 1 and further comprising the step of recording the solving of the problem of the educational game by a player.

8. An electronic game, comprising
an entertaining program;
an educational program with a problem to be solved; and a main program designed so that when the entertaining program is played it is interrupted after a predetermined time by the educational program and resumed only after the problem of the educational program has been solved by a player.

* * * * *

UNITED STATES PATENT AND TRADEMARK OFFICE
CERTIFICATE OF CORRECTION

PATENT NO. : 5,286,036
DATED : Feb. 15, 1994
INVENTOR(S) : Michael Barabash

It is certified that error appears in the above-indentified patent and that said Letters Patent is hereby corrected as shown below:

On the title page, please delete the following:

—[73] Assignee: Abrasion Engineering Company Limited, Channel Islands—.

Signed and Sealed this

Second Day of May, 1995

Attest:

BRUCE LEHMAN

Attesting Officer

Commissioner of Patents and Trademarks